US005798754A

United States Patent [19]
Selker et al.

[11] Patent Number: 5,798,754
[45] Date of Patent: Aug. 25, 1998

[54] GRIP CAP FOR COMPUTER CONTROL STICK

[75] Inventors: Edwin Joseph Selker, Palo Alto, Calif.; Kazunori Seki, Machida, Japan; Michio Suzuki, Yokohama, Japan; Kenshin Yonemochi, Kamakura, Japan

[73] Assignee: International Business Machines Corporation, Armonk, N.Y.

[21] Appl. No.: 315,651

[22] Filed: Sep. 30, 1994

[51] Int. Cl.⁶ .................................................. G06F 3/033
[52] U.S. Cl. .......................... 345/161; 74/551.9; 428/90; 400/490
[58] Field of Search ........................ 345/168, 161, 345/163, 179; 400/490, 491, 494–495; 428/34.5, 413, 90; 524/553; 364/709.15; 74/551.9, 558

[56] References Cited

U.S. PATENT DOCUMENTS

| | | | |
|---|---|---|---|
| 3,308,675 | 3/1967 | Jonsson | 74/471 R |
| 3,663,264 | 5/1972 | Wesch | 428/34.5 |
| 3,898,397 | 8/1975 | Devore et al. | 200/6 A |
| 3,965,955 | 6/1976 | Price | 150/160 |
| 3,972,528 | 8/1976 | McCracken et al. | 273/72 A |
| 4,012,039 | 3/1977 | Yerke | 74/551.9 |
| 4,029,915 | 6/1977 | Ojima | 364/709.15 |
| 4,183,100 | 1/1980 | De Marco | 2/159 |
| 4,476,742 | 10/1984 | Midgley | 74/551.9 |
| 4,540,440 | 9/1985 | Oshima | 106/148 |
| 4,565,460 | 1/1986 | Kline | 400/490 |
| 4,613,537 | 9/1986 | Krupper | 428/192 |
| 4,734,307 | 3/1988 | Thorsrud | 428/90 |
| 5,122,419 | 6/1992 | Kurato et al. | 428/413 |
| 5,134,008 | 7/1992 | Alm | 428/90 |
| 5,290,115 | 3/1994 | Little | 400/491 |
| 5,291,213 | 3/1994 | Krauss | 345/179 |
| 5,313,230 | 5/1994 | Venolia et al. | 345/163 |
| 5,407,285 | 4/1995 | Franz | 400/490 |
| 5,468,803 | 11/1995 | Takahashi et al. | 524/553 |
| 5,512,892 | 4/1996 | Corballis et al. | 345/161 |

FOREIGN PATENT DOCUMENTS

| | | |
|---|---|---|
| 2 573 988 | 6/1986 | France . |
| 3345641 | 6/1985 | Germany . |
| 01-306446 | 12/1989 | Japan . |
| 01-314192 | 12/1989 | Japan . |
| 04-345676 | 12/1992 | Japan . |
| 05-6475 | 1/1993 | Japan . |
| 2 057 192 | 3/1981 | United Kingdom . |

Primary Examiner—Mark R. Powell
Attorney, Agent, or Firm—Robert B. Martin

[57] ABSTRACT

The present invention relates to a resilient hollow grip cap for removable mounting on the top of a computer control device i.e., a finger actuated pointing stick. The cap has a plurality of short fibers adhered to its outer surface and extending outwardly away from the surface of the cap.

6 Claims, 2 Drawing Sheets

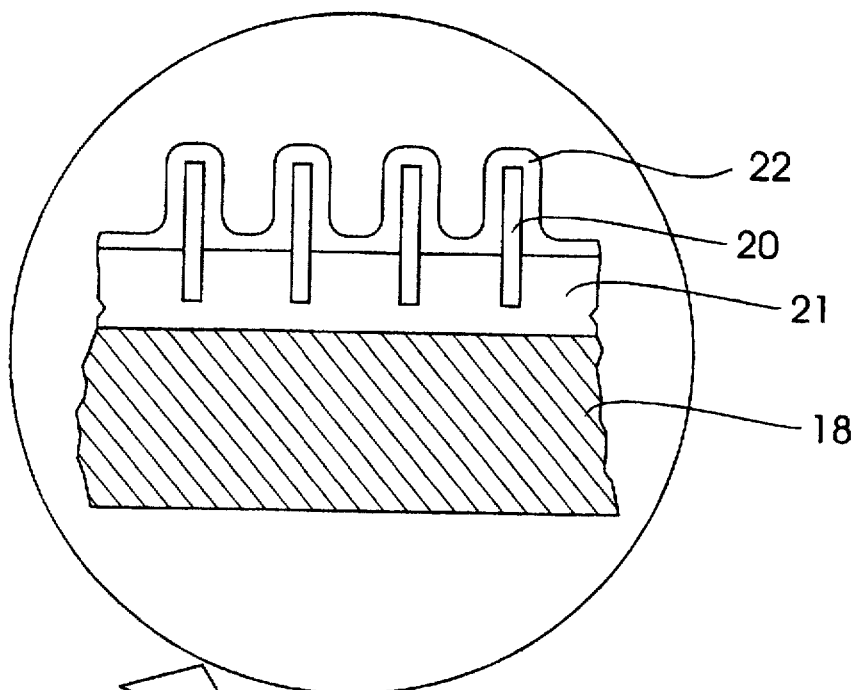
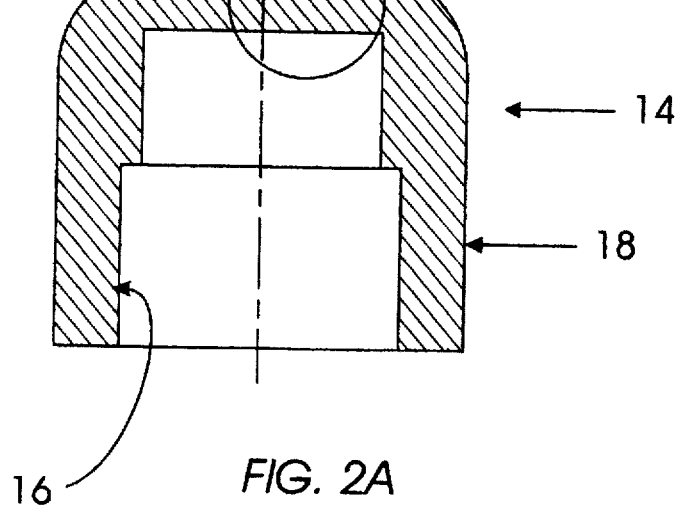
FIG. 2B
FIG. 2A 5,798,754

GRIP CAP FOR COMPUTER CONTROL STICK

TECHNICAL FIELD

The present invention relates to an improved grip cap for removable mounting on the tip of a computer control stick.

BACKGROUND OF THE INVENTION

Computer control devices are used to control the two-dimensional movements of the cursor on a computer screen. Suitable computer control devices are a mouse and a computer pointing stick. A computer pointing stick known as the TrackPoint II® is mounted on the computer keyboard close to the G-H-B keys. The force-sensitive stick is actuated by application of a horizontal force to the top of the stick by the use of the user's finger. Generally, a rubber cap made of chlorinated butyl rubber is mounted on the top of the stick. The resilient rubber cap stretches and bends slightly to provide good proprioceptive feedback to the user during use to facilitate precise movement of the cursor. However, after extended use, the surface of the rubber cap can become coated with the user's skin oil and become slippery. The slippery surface of the cap dramatically reduces proprioceptive feedback and hinders the user's ability to execute precise movements of the cursor.

There still is a need in the art for a grip cap for mounting on a computer control stick which is resilient to provide proprioceptive feedback to the user and also which does not become slippery during extended use.

It is therefore an object of the present invention to provide an improved resilient grip cap for a computer control stick. Other objects and advantages will be apparent from the following disclosure.

SUMMARY OF THE INVENTION

The present invention relates to a resilient hollow grip cap for removable mounting on the top of a computer control device. The cap has a plurality of short fibers extending outwardly away from the cap. Preferably, the fibers are covered with a protective layer to prevent them from being dislodged during use.

A more thorough disclosure of the present invention is presented in the detailed description and drawings which follow.

BRIEF DESCRIPTION OF THE DRAWING

FIG. 2A is a sectional view of a hollow grip cap for a computer control stick.

FIG. 2A is an exploded sectional view of the surface of the grip cap.

DETAILED DESCRIPTION

The present invention relates to a resilient hollow grip cap for removable mounting on the top of a computer control stick and the process for making the cap. The cap has a plurality of short polymeric fibers adhered to its outer surface and extending outwardly away from the surface of the cap.

Figure 1B:
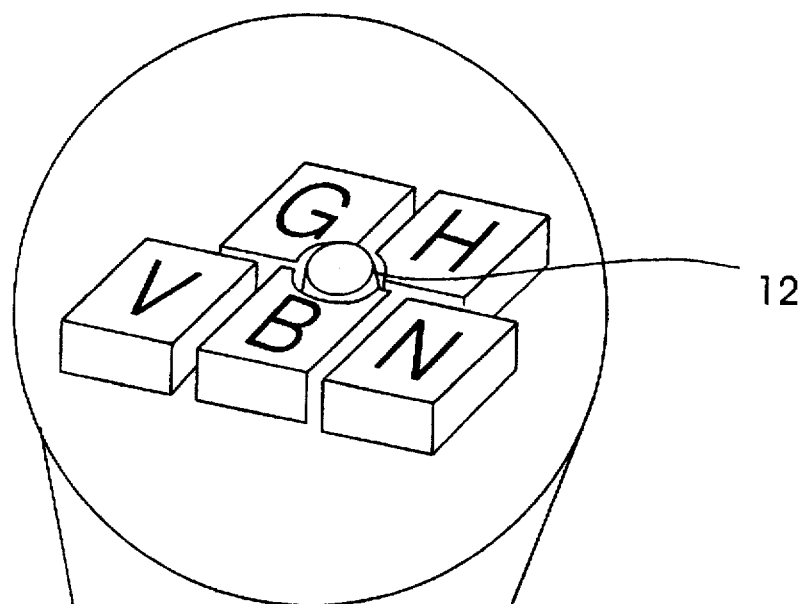
FIGS. 1A & 1B are a perspective view of a computer control stick mounted in a keyboard.
Figure 1A:
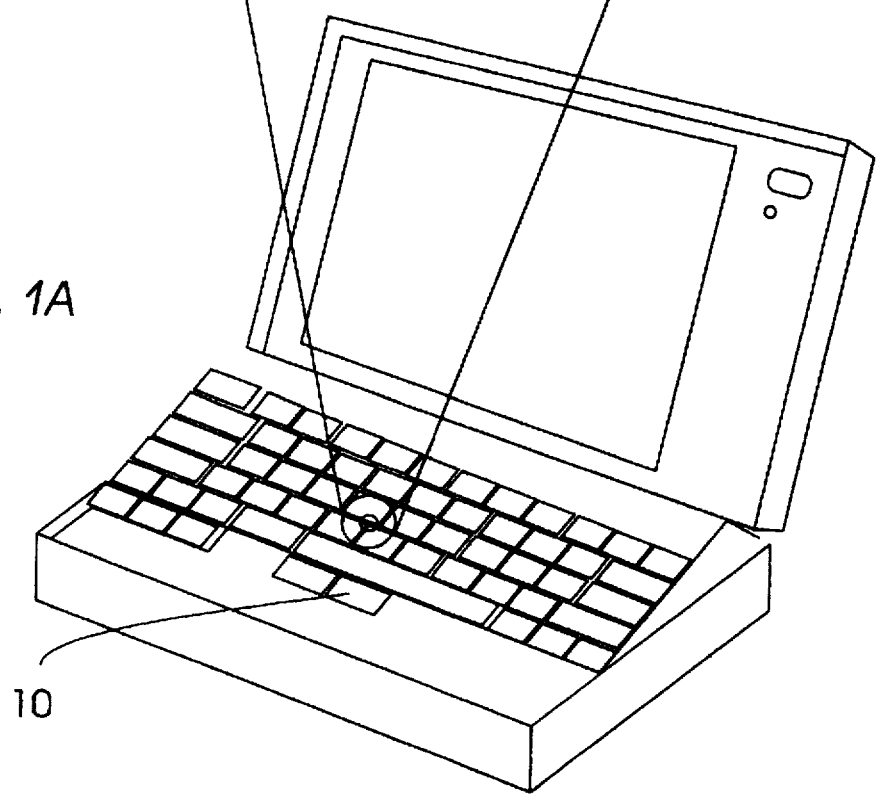

Referring to FIG. 1, there is shown a computer keyboard 10 having a finger-actuated computer control stick 12 located in the center of the keyboard. The control stick is cylindrically shaped and controls the movement of the cursor on the computer monitor. The tip of the control stick has a hollow grip cap removably mounted thereon.

Referring to FIG. 2, a hollow grip cap 14 for removable mounting on the tip of a computer control stick is generally bell shaped and has an inner surface 16 and an outer surface 18. The cap is preferably comprised of a resilient material. Preferably, the cap is comprised of butadiene-acrylonitrile copolymer. Other suitable resilient materials will be known to those skilled in the art.

Referring to FIG. 3, the outer surface 18 of the cap is provided with a plurality of fibers 20 adhered in adhesive layer 21 to the outer surface 18 and extending outwardly away from the surface of the cap. Preferably, these fibers 20 are provided with a protective covering 22.

The grip cap of the present invention is suitably made by a two-step process. The first step of the process involves the art-known process of compression molding to make the bell-shaped cap. Sheets of polymer are compression molded by art-known methods to provide a large number of interconnected bell-shaped caps on each sheet (e.g., each sheet having a plurality of hollow bell-shaped protrusions formed on one side of the sheet).

The second step of the process involves electrostatic coating of short fibers onto the outer surface of the cap. Suitable fibers comprise a tough polymer such as nylon. Suitably, the fibers are generally cylindrically shaped with a small diameter, e.g., about 0.06 mm, and a short average length of less than about 2.0 mm, preferably less than about 1.0 mm more preferably about 0.3 mm. Suitable fibers are commercially available from Nissen Company Ltd. The fibers are disposed in the reservoir of an electrostatic powder coating system. Suitably, the system is a corona discharge system. The sheets of polymer are placed on a grounded metal plate and a thin coating of liquid adhesive is disposed on the sheet to cover the outer surface of the cap. Suitable liquid adhesives are silane adhesives. Alternatively, the cap can be heated to an elevated temperature to adhere the fibers into the cap without the liquid adhesive. The fibers are then sprayed through the corona discharge onto the surface of the sheet. The fibers are adhered to the sheet by the liquid adhesive. Because charge relaxation does not occur on impact with the sheet, electrostatic repulsion causes a large number of individual fibers to extend outwardly generally vertically away from the outer surface of the cap.

After the fibers have been adhered to the outer surface of the cap, they are preferably covered with a protective coating to prevent the fibers from being dislodged during use. The protective coating can be applied by dipping the polymer sheet into the liquid coating. Preferably, two coatings are applied to the sheet. First, a urethane adhesive coating is applied. Then, after the first coating dries, a butadiene-acrylonitrile copolymer is applied. Lastly, the individual caps are cut from the polymer sheets by press die cutting. The caps of the present invention are resilient to provide proprioceptive feedback to the user to enable execution of precise movements of the cursor. The fibers on the cap enhance the proprioceptive feedback to the user and also enable extended use of the cap without the surface becoming slippery.

Alternatively, the cap of the present invention can be made from a section of twisted fiber rope, e.g., nylon rope. The inner surface 16 of the cap can be formed by melting the fibers at one end of the rope section with a heated mandrel.

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

What is claimed is:

1. A resilient hollow grip cap for removable mounting on the tip of a computer control device, the cap having a plurality of fibers adhered to the surface of the cap and extending outwardly away from the cap where the fibers are covered with a protective coating.

2. The cap of claim 1 wherein the cap comprises butadiene-acrylonitrile copolymer.

3. The cap of claim 2 wherein the fibers have a length of less than about 2.0 mm.

4. A process for making a resilient hollow grip cap for removable mounting on a computer control device, the cap having a plurality of fibers covered with a protective coating and adhered to the surface of the cap and extending outwardly away from the surface of the cap wherein the process comprises the steps of:

(a) forming the cap;

(b) covering the outer surface of the cap with an adhesive;

(c) electrostatically spraying fibers onto the outer surface of the cap and (d) apply a protective coating to the fibers.

5. The process of claim 4 wherein the cap comprises butadiene-acrylonitrile copolymer.

6. The process of claim 4 wherein the fibers have a length less than 2.0 mm.

* * * * *